(12) United States Patent
Xue et al.

(10) Patent No.: US 10,246,756 B2
(45) Date of Patent: Apr. 2, 2019

(54) HEAT TREATMENT SYSTEM AND HEAT TREATMENT METHOD

(71) Applicant: TOPY KOGYO KABUSHIKI KAISHA, Tokyo (JP)

(72) Inventors: Weidong Xue, Tokyo (JP); Nobuyuki Suga, Tokyo (JP); Kenzo Uchida, Tokyo (JP); Ryuhei Masuda, Tokyo (JP); Daisuke Nojo, Tokyo (JP); Seiji Nobata, Tokyo (JP); Kiyokazu Niwa, Tokyo (JP); Yugo Takeuchi, Tokyo (JP)

(73) Assignee: TOPY KOGYO KABUSHIKI KAISHA, Tokyo (JP)

( * ) Notice: Subject to any disclaimer, the term of this patent is extended or adjusted under 35 U.S.C. 154(b) by 265 days.

(21) Appl. No.: 15/124,536

(22) PCT Filed: Jun. 4, 2015

(86) PCT No.: PCT/JP2015/066137
§ 371 (c)(1),
(2) Date: Sep. 8, 2016

(87) PCT Pub. No.: WO2016/002421
PCT Pub. Date: Jan. 7, 2016

(65) Prior Publication Data
US 2017/0016082 A1 Jan. 19, 2017

(30) Foreign Application Priority Data

Jun. 30, 2014 (JP) .................................. 2014-133910

(51) Int. Cl.
*C21D 1/667* (2006.01)
*C21D 9/08* (2006.01)
(Continued)

(52) U.S. Cl.
CPC .............. *C21D 9/085* (2013.01); *C21D 1/667* (2013.01); *C21D 9/08* (2013.01); *C21D 1/10* (2013.01); *C21D 9/00* (2013.01)

(58) Field of Classification Search
None
See application file for complete search history.

(56) References Cited

U.S. PATENT DOCUMENTS 6,024,913 A * 2/2000 Ogawa ..................... C21D 1/10
266/129
6,179,936 B1 * 1/2001 Yoshida ................... C21D 1/18
148/570

(Continued)

FOREIGN PATENT DOCUMENTS

CN 2307004 Y 2/1999
CN 101490286 A 7/2009
(Continued)

OTHER PUBLICATIONS

English translation of JP 2002-080914 (published Mar. 2002) from Espacenet.*
(Continued)

*Primary Examiner* — George Wyszomierski
(74) *Attorney, Agent, or Firm* — Kratz, Quintos & Hanson, LLP

(57) ABSTRACT

The present invention addresses the issue of providing a heat treatment system and a heat treatment method whereby the inner circumference of a cylindrical workpiece can be reliably cooled regardless of the dimensions or shape of the workpiece and productivity can be improved, during quenching of the inner circumference of the cylindrical workpiece. The present invention has: rotating devices 18, 19 that rotate the cylindrical workpiece 11: holding members 181, 191 that hold the cylindrical workpiece 11 at a prescribed position; a heating member 16 that heats the cylin- (Continued)

drical workpiece 11 from the inner circumferential surface side; a cooling device 17 that injects cooling fluid and cools the cylindrical workpiece 11 from the outer circumferential surface side; and a injecting device 34 provided at a position separated from the cooling device 17 and which inject the cooling fluid.

6 Claims, 12 Drawing Sheets

(51) Int. Cl.
*C21D 9/00* (2006.01)
*C21D 1/10* (2006.01)

(56) References Cited

U.S. PATENT DOCUMENTS

| | | |
|---|---|---|
| 2009/0183805 A1 | 7/2009 | Osako et al. |
| 2010/0252150 A1 | 10/2010 | Xue |

FOREIGN PATENT DOCUMENTS

| | | | |
|---|---|---|---|
| CN | 102732702 A | | 10/2012 |
| CN | 103114191 A | | 5/2013 |
| CN | 103582709 A | | 2/2014 |
| CN | 103773937 A | | 5/2014 |
| GB | 548970 | | 11/1942 |
| JP | H01-309927 A | | 12/1989 |
| JP | H11-21618 | | 1/1999 |
| JP | 2000-73121 | | 3/2000 |
| JP | 2001-98326 A | | 4/2001 |
| JP | 2002080914 A | * | 3/2002 |
| JP | 2006-152393 A | | 6/2006 |
| JP | 3880086 B2 | | 2/2007 |
| JP | 2012-197488 A | | 10/2012 |
| WO | 2013008831 A1 | | 1/2013 |

OTHER PUBLICATIONS

International Search Report for International Application No. PCT/JP2015/066137 dated Sep. 8, 2015.

* cited by examiner

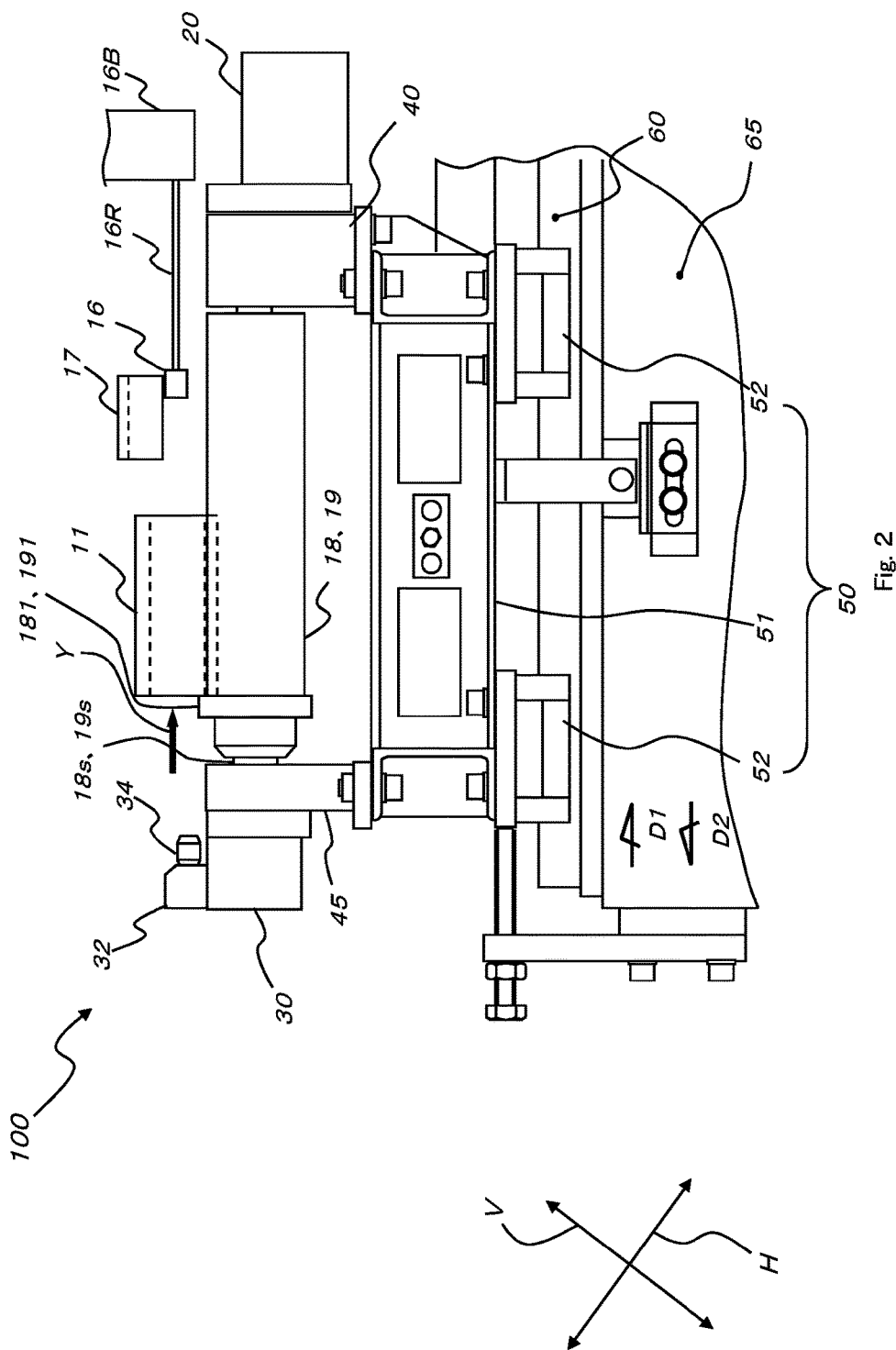

_US 10,246,756 B2_

HEAT TREATMENT SYSTEM AND HEAT TREATMENT METHOD

TECHNICAL FIELD

The present invention relates to a technology of cooling an inner circumferential surface side of a hollow cylindrical workpiece (for example, a bushing for crawler).

BACKGROUND ART

As the hollow cylindrical workpiece that becomes an object to be heat-treated, for example, there is a bushing being one of components for crawler of a construction vehicle. However, it does not mean that the hollow cylindrical workpiece is limited to the bushing for crawler merely.

A bushing for crawler is a component which transmits power while an inner circumferential surface is in contact with a pin and an outer circumferential surface is in contact with a sprocket. Therefore, strength, toughness, wear resistance property (abrasion resistance property) and so on are required to a bushing for crawler.

In order to satisfy requirements such as the strength, the toughness, the wear resistance property and so on of a bushing, it is known there is a manufacturing method (or a heat treatment method) including a step of performing outer circumference quenching of the bushing and a step of performing inner circumference quenching of the bushing. Here, as a cooling method in the step of performing inner circumference quenching of the bushing, conventionally, a technique (for example, Patent Literature 1) of cooling by injecting a cooling liquid to an outer circumferential surface of the bushing has been carried out widely.

Recently, it is required to improve the wear resistance property by increasing a depth of a hardened layer on the outer circumferential surface side while maintaining a hardened layer depth on the inner circumferential surface side of the bushing in a fixed range. In order to fulfill such the requirements, it is insufficient to carry out cooling step by injecting a cooling liquid to a bushing outer circumferential surface merely, and also, it is necessary to cool a bushing inner circumferential surface side.

In the prior art, as a method of cooling an inner circumferential surface side of a bushing, there is a method in which a cooling jacket is inserting into the bushing and the cooling liquid is injected from the cooling jacket (see Patent Literature 2).

In addition, there is a cooling method in which cooling the inner circumferential surface side of the bushing is carried out by attaching the cooling jacket to a leading end part of a heating coil which has been inserted into the bushing inner area and injecting the cooling liquid from a concerned the cooling jacket.

Further, a technology for cooling the inner circumferential surface side of the cylindrical component is proposed, in which technology a liquid flow control member is set in an inside area of a cylindrical component and a cooling liquid is injected from a cooling liquid injecting device having been arranged at an outside area of the cylindrical component (see Patent Literature 3).

However, in the prior art in which the cooling jacket is inserted into the bushing and the cooling liquid is injected from the inserted cooling jacket, it is necessary to wait a completion of process for replacing a bushing having been carried out a heat treatment by a bushing to be subjected to heat treatment, until the cooling jacket being inserted into the bushing is returned to an original position thereof (a position at which the cooling jacket is out of the inner area of the bushing) even after quenching of the bushing has been completed by injecting the cooling liquid to the bushing inner circumferential surface side. Therefore, there is a demerit for decreasing the effectiveness for manufacturing bushings.

In addition, since the cooling jacket has to be moved frequently so as to reciprocate between the position (the original position) at which the cooling jacket is out of (detached from) the bushing inner area and the position (a position after inserted) at which the cooling jacket is inserted into the bushing inner area, a so-called "off-center" is generated easily in the cooling jacket and there is an adverse effect of uniformity in quenching quality.

In addition, in the prior art in which a bushing inner circumferential surface side is cooled with the cooling liquid having been injected from the cooling jacket attached to the leading end part of the cooling coil being inserted into an inner area of the bushing, it is necessary to form a path for the cooling liquid in an area along with a center line of the cooling coil. Therefore, there is a case that the cooling jacket cannot be inserted into a workpiece being small in inner diameter.

In addition, since the diameter of an injection orifice in the cooling jacket is small, impurities in the cooling liquid will clog the injection orifice easily. In a case that such clogging is generated, the cooling liquid cannot be injected and a quenched structure becomes non-uniform, and therefore, there is a problem that a quality abnormality of the bushing as a heat-treated product is generated.

Since it is also necessary to insert the liquid flow control member and to form the path of the cooling liquid in the cylindrical component in the prior art in which the liquid flow control member is set in an inside are of the cylindrical component and the cooling liquid is injected from the cooling liquid injecting device provided in an outside area of the cylindrical component so as to cool the inner circumferential surface side of the cylindrical component, there is a problem that it is impossible to apply such the prior art for a workpiece being small in inner diameter.

PRIOR ART LITERATURE

Patent Literature

[Patent Literature 1] Japanese Patent No. 3880086
[Patent Literature 2] Japanese Unexamined Patent Application Publication No. 2000-73121 (JPA2000-73121)
[Patent Literature 3] Japanese Unexamined Patent Application Publication No. H11-21618 (JPAH11-21618)

SUMMARY OF INVENTION

Problems to be Solved by Invention

The present invention has been created in view of the above-mentioned problems of the prior art and objects thereof are to provide a heat treatment system and a heat treatment method being capable of cooling surely an inner circumferential surface of a cylindrical workpiece regardless of the dimensions or size of the workpiece in an inner circumference quenching of the cylindrical workpiece and being capable of improving an productivity of manufacturing bushings.

Constructions for Solving Problem

A heat treatment system of the present invention is characterized in that the system comprises rotating devices (a workpiece rotating rollers 18, 19) which rotate a cylindrical workpiece (11: for example, a bushing for crawler), holding members (a stopper 181, 191) which hold the cylindrical workpiece (11) at a predetermined position (end parts of the rollers 18, 19), a heating member (a heating coil 16) which heats the cylindrical workpiece (11) from an inner circumferential surface side (of the workpiece), a cooling device (a cooling jacket 17) which cools the cylindrical workpiece (11) from an outer circumferential surface (11o) side (of the workpiece) by injecting a cooling liquid, a injecting device (a nozzle 34) which is disposed at a position remote from the cooling device (17) and injects the cooling liquid, heating member holding members (a heating coil fixing rod 16R and a heating coil fixing bracket 16B) which hold the heating member (16) fixedly in position, a cooling device holding member (not shown) which holds the cooling device (17) fixedly in position, and a base member (a moving device 50) to which the rotating devices (18, 19) and the injecting device (34) are mounted and which moves relative to the heating member (16) and the cooling device (17), wherein the heating member (16) has a function for heating (for example, induction heating) an inner circumferential surface (11i) side of the cylindrical workpiece (11) in a case that the base member (50) moves and the heating member (16) is positioned (inserted) in a radial inner region of the cylindrical workpiece (11) which has been held by the holding member (181, 191), and wherein the injecting device (34) has a function for injecting the cooling liquid toward a heating member end face (16t) in the case that the base member (50) moves and the heating member (16) is positioned (inserted) in the radial inner region of the cylindrical workpiece (11) which has been held by the holding member (181, 191).

In the present specification, there are cases that the heating member (16) and the heating member holding member (16R, 16B) are generically described as a phrase "heating device".

In the heat treatment system of the present invention, it is preferable that said base member (the moving device 50) is inclined relative to a horizontal plane, said holding members (the stopper 181, 191) have a function for holding the cylindrical workpiece (11) by a injecting device side end part of the rotating device (18, 19), said base member (the moving device 50) has a function for moving in a direction toward a side being close to the heating member (16) in a case that the cylindrical workpiece (11) is held by the injecting device side end parts of the rotating devices (18, 19), and for moving in a direction being removed from the heating member (16) in a case that the heating member (16) is positioned in the vicinity of an injecting device side end part in the radial inner region of the cylindrical workpiece (11), said heating member (16: being mounted fixedly) has a function for starting induction heating in a case that the heating member concerned (16) is positioned in the vicinity of the injecting device side end part of the radial inner region of the cylindrical workpiece (11) (in a positional relationship with the cylindrical workpiece 11), said injecting device (34) has a function for starting cooling liquid injecting toward the heating member end face (16t) in a case that said heating member (16) is positioned in the vicinity of the injecting device side end part of the radial inner region of the cylindrical workpiece (11) (in a positional relationship with the cylindrical workpiece 11), and that said cooling device (the cooling jacket 17) has a function for starting cooling liquid injecting to the workpiece outer circumferential surface (11o) in a case that said heating member (16) is positioned in the vicinity of the injecting device side end part of the radial inner region of the cylindrical workpiece (11) (in a positional relationship with the cylindrical workpiece 11).

A heat treatment method of the present invention is characterized in that the method comprises a step for holding a cylindrical workpiece at a predetermined position (an end part of a workpiece rotating roller) by holding members (the stopper 181, 191), a step for positioning a heating member (16) in a radial inner region of the cylindrical workpiece (11) being held by the holding members (181, 191), by means of the base member (the moving device 50) to which the rotating devices (18, 19) and the injecting device (34) are mounted and which moves relative to the heating member (16) and the cooling device (17), and a step for heating the cylindrical workpiece (11) by the heating member (the coil 16) from an inner circumferential surface side while cooling the cylindrical workpiece (11) from an outer circumferential surface (11o) side by injecting a cooling liquid from the cooling device (the cooling jacket 17), and injecting the cooling liquid from the injecting device (the nozzle 34) in a direction being toward a heating member end face (16t).

In the heat treatment method of the present invention, it is preferable that in the step for cooling the cylindrical workpiece (11) from the outer circumferential surface side by injecting the cooling liquid from the cooling device (the cooling jacket 17), the step is started when the cooling device (17) is positioned in the vicinity of the injecting device (34) side end part of the radial outer region of the cylindrical workpiece (11) (in relative positions between the fixedly mounted heating member 16 and the fixedly mounted cooling device 17), in the step for heating the cylindrical workpiece (11) from the inner circumferential surface side by the heating member (the heating coil 16), the step is started when the heating member (16) is positioned in the vicinity of the injecting device (34) side end part of the radial inner region of the cylindrical workpiece (11) (in relative positions between the fixedly mounted heating member 16 and the fixedly mounted cooling device 17), and that in the step for injecting the cooling liquid from the injecting device (the nozzle 34) in the direction toward the heating member end face, the step is started when the heating member (16) is positioned in the vicinity of the injecting device (34) side end part of the radial inner region of the cylindrical workpiece (11) (in relative positions between the fixedly mounted heating member 16 and the fixedly mounted cooling device 17).

In the heat treatment method of the present invention, it is preferable that quenching of a first process and quenching of a second process are performed, wherein in the quenching of said first process, quench hardening is performed across the entire thickness of said workpiece (11), by heating merely from the outer circumferential surface side (11o) of the cylindrical workpiece (11) to a temperature range between a temperature being equal to and more than the $Ac_3$ temperature and a temperature equal to and less than the $Ac_3$ temperature+200° C. across the entire thickness of said workpiece (11), making the temperature of said workpiece (11) being uniform in a longitudinal direction and a thickness direction, cooling is started before that the temperature of said workpiece (11) is lowered down to the $Ar_3$ temperature and cools said workpiece (11) from the outer circumferential surface side, in the quenching of said second process, said workpiece (11) having been carried out the quench hardening is cooled from the outer circumferential surface (11o) side of said workpiece (11) by injecting the cooling liquid from the cooling device (17), said workpiece (11) is heated from the inner circumferential surface (11i) side by the heating member (16) and is heated to the temperature range between a temperature equal to and more than the $Ac_3$ temperature and a temperature equal to and less than the $Ac_3$ temperature+ 200° C., and the cooling liquid is injected from the injecting device (34) in the direction toward the heating member end face (16t).

In the heat treatment method of the present invention, it is preferable that quenching of a first process and quenching of a second process are carried out, in which in the quenching of said first process, quench hardening is carried out across the entire thickness of said workpiece (11), by induction heating the cylindrical workpiece (11) merely from the outer circumferential surface (11o) side of said cylindrical workpiece (11) to a temperature between a temperature equal to and more than the $Ac_3$ temperature and a temperature equal to and less than the $Ac_3$ temperature+ 200° C. across the entire thickness of said workpiece (11), by utilizing a time until the workpiece (11) reaches a cooling section that is remote from a heating section after said induction heating, the temperature of the workpiece (11) make uniform in a longitudinal direction and a thickness direction, and then, cooling is started before the temperature of said workpiece (11) is lowered down to the $Ar_3$ temperature and cool the workpiece (11) merely from the outer circumferential surface side thereof, in the quenching of said second process, while cooling said workpiece (11) having been carried out the quench hardening across the entire thickness from an outer circumference side (the outer circumferential surface 11o side), the inner circumferential surface (11i) side is heated to the temperature between a temperature equal to and more than the $Ac_3$ temperature and a temperature equal to and less than the $Ac_3$ temperature+200° C., and the cooling liquid is injected from the injecting device (34) toward the heating member end face (16t).

In embodiment of the present invention, it is preferable that the cylindrical workpiece (11) is a bushing of a crawler. However, it does not mean that the cylindrical workpiece is limited to the bushing of the crawler.

Effects of Invention

According to the present invention which comprises the above-mentioned constructions, since in a case that the base member (50) moves and the heating member (16) is positioned in the radial inner region of the cylindrical workpiece (11) being held by the holding members (181, 191), the injecting device (34) injects the cooling liquid in the direction toward the heating member end face (16t), the injected cooling liquid bounces off (as a scattering liquid RWJ) on the heating member end face (16t) and collides (contacts) with and cools the inner circumferential surface (11i) of the cylindrical workpiece. Although, in general, the heating member end face (16t) is plane, it is also possible to form the heating member end face into a conical shape in order to make the cooling liquid easily bounces off, to form an relief groove therein, and to mount an attachment of the same shape thereto.

Then, according to the present invention, in a case that the heating member (16) is positioned in the radial inner region of the cylindrical workpiece (11), since the heating member (16) induction heats the inner circumferential surface (11i) side of the cylindrical workpiece, and the injecting device (34) injects (WJ) the cooling liquid toward the heating member end face (16t), the inner circumferential surface (11i) side is heated to a temperature equal to and more than the $Ac_3$ temperature and is cooled with the cooling liquid (the scattering liquid RWJ) which has bounced off on the heating member end face (16t) while the heating member (16) is positioned in the radial inner region of the cylindrical workpiece (11).

In the meanwhile (while the heating member 16 is positioned in the radial inner region of the cylindrical workpiece 11), the cooling liquid is injected from the cooling device (17) to the outer circumferential surface (11o) of the cylindrical workpiece.

Consequently, while the heating member (16) is positioned in the radial inner region of the cylindrical workpiece (11), inner circumference quenching is carried out to the cylindrical workpiece (11), and cooling thereof is carried out from both of the outer circumferential surface (11o) side and the inner circumferential surface (11i) side of the cylindrical workpiece. Accordingly, wear resistance property can be improved by increasing the depth of the hardened layer on the outer circumferential surface (11o) but maintaining the depth of the hardened layer on the inner circumferential surface (11i) side of the cylindrical workpiece being equal to and more than the pre-determined depth.

In addition, according to the present invention, since the injecting device (34) is not positioned in the radial inner region of the cylindrical workpiece (11), when the heating member (16) is detached from the radial inner region of the cylindrical workpiece (11) (the heating member 16 is out of the radial inner region of the cylindrical workpiece 11) and inner circumference quenching of the cylindrical workpiece (11) has been completed, any member in the heat treatment system is not positioned in the radial inner region of the cylindrical workpiece (11). Therefore, after inner circumference quenching has been completed, the workpiece (11) to which the heat treatment has been completed can be immediately replaced by the workpiece (11) to be carried out the heat treatment.

In other words, according to the present invention, a useless waiting time (for example, a time for waiting until the cooling jacket is detached from the radial inner region of the cylindrical workpiece) being necessary in the prior art becomes unnecessary. Consequently, according to the present invention, work efficiency of heat treatment for the cylindrical workpiece can be improved.

Further, according to the present invention, the injecting device (34) injects the cooling liquid in the direction toward the heating member end face (16t) which is positioned in the radial inner region of the cylindrical workpiece (11), and it does not mean that the injecting device itself is inserted into the radial inner region of the cylindrical workpiece (11).

Therefore, by controlling an outer diameter of a jet stream, the injected cooling liquid intrudes into the radial inner region of the workpiece (11) regardless of an inner diameter size of the cylindrical workpiece (11), bounces off on the heating member end face (16t) (as the scattering liquid RWJ), collides with (contacts with) and surely cools the inner circumferential surface (11i). That is, according to the present invention, the inner circumferential surface (11i) side of the cylindrical workpiece (11) can be surely cooled and expected inner circumference quenching can be carried out regardless of the inner diameter size of the cylindrical workpiece (11).

Then, according to the present invention, heat treatment can be efficiently performed, which treatment makes the outer circumferential surface (11o) side and the inner circumferential surface (11i) side of the cylindrical workpiece (11) have the hardness that is in excess of effective hardness and makes the hardness of the core portion in the direction of the cylindrical workpiece have hardness that is less than the effective hardness.

Here, the effective hardness means a hardness level that can be regarded (guessed) to be "hardened" when a steel material has been quenched to be hardened and is different depending on the level of the wear resistance property that is required to the cylindrical workpiece (11) and a carbon content of the steel material of the cylindrical workpiece (11).

BRIEF DESCRIPTION OF DRAWINGS

FIG. 2 It is an explanatory diagram showing essential parts of a device for performing quenching of a second process.

EMBODIMENT FOR CARRYING OUT THE INVENTION

In the following, an embodiment of the present invention will be described with reference to the appended drawings.

In prior to explain the embodiment of the present invention, a heat treatment device which carry out a heat treatment being preferable to apply the present invention will be described.

The heat treatment which is preferable to apply the present invention is constructed so as to perform quenching of the cylindrical workpiece at two stages, that is, so as to perform quenching of a first process and quenching of a second process. In the illustrated embodiment, the bushing of the crawler (hereinafter, described as the "bushing") is heat-treated as the cylindrical workpiece.

Quenching of the first process is performed in an entire area in the thickness direction of the bushing 11.

In the region to be performed quenching of the first process, the bushing 11 is induction heated by a heating coil (an induction heating device) 12 from the outer circumferential surface side. Then, it is induction heated to the temperature that is at least the $Ac_3$ point (the $Ac_3$ temperature) and not more than the $Ac_3$ point+200° C. (desirably, the $Ac_3$ temperature+50° C.) in an entire area in the thickness direction of the bushing 11.

In induction heating, a heating depth can be accurately set by selecting a frequency of an induction type power supply unit. In an induction heating by the heating coil 12, the frequency of the induction type power supply unit is selected such that the entire thickness of the bushing 11 being in the form of a cylindrical shape is heated to the above-mentioned temperature.

Figure 1:
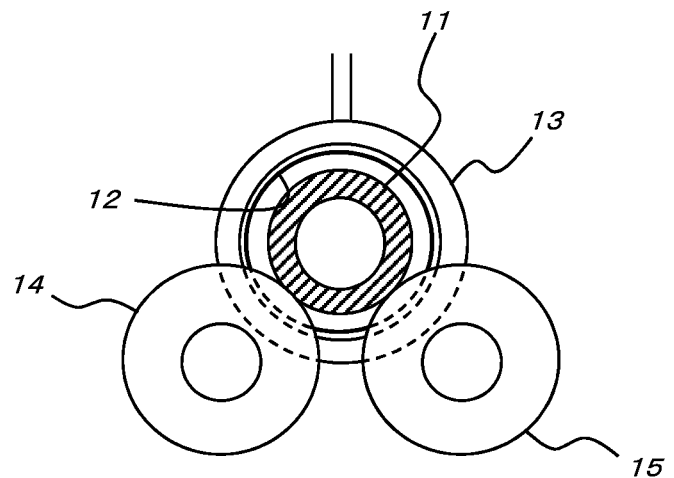
FIG. 1 It is a front view of a device for performing quenching of a first process.

In the above-mentioned quenching of the first process, as shown in FIG. 1, the bushing 11 is conveyed in a situation in which the bushing 11 is mounted on one pair of rotating conveyance rollers 14, 15. Conveyance of the bushing 11 is carried out by rotating the bushing 11 by rotating the conveyance rollers 14, 15 and said conveyance of the bushing 11 is performed by inclining slightly downward one of one pair of the conveyance rollers 14, 15 in a traveling direction of the bushing 11.

In the quenching of the first process, the heating coil 12 and a cooling jacket 13 are positioned so that they leaved each other by a predetermined space. The bushing 11 having been induction heated by the heating coil 12 is then cooled by the cooling jacket 13 after a predetermined time has elapsed. Then, the temperature of the bushing 11 becomes substantially uniform in a longitudinal direction and in a thickness direction of the bushing 11, by heat radiation and heat conduction of the bushing 11, in a time interval until it is cooled by the cooling jacket 13 after having been induction heated by the heating coil 12. After having been induction heated by the heating coil 12, the temperature of the bushing 11 is gradually lowered by heat radiation with elapsed time. Quench hardening is preformed across the entire thickness of the bushing 11 by cooling the bushing 11 only from the outer circumferential surface side with the cooling liquid from the cooling jacket 13 before the temperature of the bushing 11 is lowered down to the $Ar_3$ point (the $Ar_3$ temperature). Since the entire area in the thickness direction of the bushing 11 is rapidly cooled from at least the $Ar_3$ point, the entire thickness of the bushing 11 is subjected to quench hardening. Thereby, the entire thickness of the bushing 11 has almost the same hardness and a metallographic structure shifts to a martensitic structure.

In addition, in the quenching of the first process, immediately after the bushing 11 being the cylindrical shape has been induction heated to the temperature which is at least the $Ac_3$ temperature and not more than the $Ac_3$ temperature+ 200° C. by the heating coil 12 only from the outer circumferential surface side of the bushing 11 across the entire thickness, it is possible to cool the bushing 11 by the cooling jacket 13 only from the outer circumferential surface side.

Here, heating in the quenching of the first process is not limited to the heating coil 12 in a case that a heat treatment for hardening is carried out in the entire area in the thickness direction of the work, and it is also possible to use a heating furnace and other heating means.

Next, the quenching of the second process will be explained hereinafter. The quenching of the second process is performed after the quenching of the first process has been performed and is performed to the bushing 11 which is applied to quench hardening in an entire area in the thickness direction thereof.

Although details will be described below with reference to FIG. 2, the quenching of the second process is carried out by means of the heating coil 16 (as explained below with reference to FIG. 2) and carried out to the inner circumferential surface 11i side of the bushing 11 so as to induction heat to the temperature which is at least the $Ac_3$ temperature and is not more than the $Ac_3$ temperature+200° C. (desirably, to a temperature the $Ac_3$ point+50° C.).

Here, in the quenching of the second process, when induction heat is applied to the inner circumferential surface 11i side of the bushing 11, it is cooled from the outer circumferential surface 11o side of the bushing 11 and is also cooled from the inner circumferential surface 11i side of the bushing 11, as explained below with reference to FIG. 4.

In the quenching of the second process, the bushing 11 being traveled from an area, in which the first process is carried out, is induction heated from the inner circumferential 11i side and is cooled from the outer circumferential surface 11o side and is also cooled from the inner circumferential surface 11i side.

As described later, in the quenching of the second process, rotation of the bushing 11 is performed by putting the bushing 11 on one pair of the rotating rollers 18, 19.

In addition, details of heating means and cooling means in the second process will be described in explanation below with reference to following drawings of FIGS. 2 to 14.

As described above, in the second process, the bushing 11 is cooled by the cooling jacket 17 (refer to FIGS. 2 and 3) from the outer circumferential surface side, and is also cooled by injecting the cooling liquid to the inner circumferential surface of the bushing 11.

In the following, an embodiment of performing quenching to the bushing 11 will be explained with reference to FIG. 2 to FIG. 14.

First, with reference to FIGS. 2 and 3, a heat treatment system (a cooling device 100) will be described. By means of said heat treatment system (a cooling device 100), the bushing 11 is induction heats from the inner circumferential surface side, said bushing being traveling from an area in which the quenching of the first process is carried out, and the bushing 11 is cooled from the outer circumferential surface side and from the inner circumferential surface side, in the quenching of the second process.

In FIG. 2, the cooling device 100 is constructed so as to be inclined (inclined such that the left-side of the device 100 is lowered than the right-side thereof) relative to a horizontal direction (a direction shown by an arrow H in FIG. 2), and an angle of inclination is set to be, for example, 45 degrees (45°) relative to the horizontal direction (the arrow H direction). In addition, an arrow V shown in FIG. 2 extends in a direction (a vertical direction) being perpendicular to the horizontal direction.

The technical contents that the cooling device 100 is inclined relative to the horizontal direction (the arrow H direction in FIG. 2) are shown also in, for example, the drawings of FIGS. 4 to 13.

The cooling device 100 comprises the workpiece rotating rollers 18, 19, the heating coil 16, a roller rotating motor 20, a cooling liquid supply block 30, the moving device 50, and a rail 60.

In FIG. 2, the stoppers 181, 191 are provided in the vicinity of a left end of the rollers 18, 19. The stoppers 181, 191 are larger than the outer diameter of the rollers 18, 19 in diameter, are formed in a brimmed-shape, and project outwardly in a radial direction of the rollers 18, 19.

The cooling device 100 is inclined relative to the horizontal direction H and the left side is positioned lower in FIG. 2. Then, the stoppers 181, 191 abut on the left end of the bushing 11 which has been put on the rollers 18, 19 and prevent a situation that the bushing 11 being put on the rollers 18, 19 is fallen from the left end (in FIG. 2) of the rollers 18, 19.

The roller shafts 18s, 19s are fixedly provided at the center of both end parts of the rollers 18, 19, and the roller shafts 18s, 19s are rotated by the roller rotating motor 20 being provided on the right side in FIG. 2.

Then, the two rollers 18, 19 being arranged in parallel with each other are constructed by engaging gears so as to rotate in the same direction when the rollers 18, 19 are rotated by the roller rotating motor 20.

A right end side of the roller shaft 18s, 19s is pivotally supported so as to be rotatable by a first roller bearing 40, and the left end side of the roller shaft 18s, 19s is pivotally supported so as to be rotatable by a second roller bearing 45.

The cooling liquid supply block 30 is arranged on an end part (the left end in FIG. 2) of the cooling device 100. A cooling liquid injection nozzle 34 is attached to the cooling liquid supply block 30 via a nozzle attachment bracket 32. Here, the cooling liquid injection nozzle 34 is constructed such that the cooling liquid is injected from a tip thereof. Then, the cooling liquid supply block 30 supplies the cooling liquid to the bracket 32 under a pre-determined pressure, and the cooling liquid is injected from the tip of the cooling liquid injection nozzle 34.

The moving device 50 is provided with, for example, a frame 51 which is constructed by U-shaped steel and is combined in the form of a parallel-cross frame (well crib), and a plurality of shifters 52 which are arranged in a lower end of the frame 51. The shifters 52 are guide members each of which has a function of guiding the moving device 50 when the moving device 50 moves on the rail 60 in the directions indicated by the arrows D1 and D2. Although not clearly shown in FIG. 2, the moving device 50 is driven by a not shown drive source (for example, an electric motor).

Here, since the nozzle 34 and the rollers 18, 19 are fixed to the moving device 50 by well-known means (for example, bolts and nuts), the nozzle 34 and the rollers 18, 19 (also including the bushing 11 being mounted on the rollers 18, 19) integrally move in the directions shown by the arrows D1 and D2.

In contrast, since the heating coil 16 is not fixed to the moving device 50 and is fixed to a not shown member via heating member holding members (a heating coil fixing rod 16R and a heating coil fixing bracket 16B), a heating device comprising the heating coil 16, the heating coil fixing rod 16R and the heating coil fixing bracket 16B is fixed, and the position of the heating device is fixed when the bushing 11 is carried out a quenching from the inner circumferential surface 11i side. Accordingly, the heating coil 16 does not move and the position thereof does not change (the position is fixed) even the moving device 50 moves in the directions shown by the arrows D1 and D2.

Therefore, the nozzle 34 and the rollers 18, 19 (also including the bushing 11 being mounted on the rollers 18, 19) move relative to the heating coil 16 in the directions shown by the arrows D2 and D1.

Here, electric power for heating is supplied from a not shown power source to the heating coil 16 via the heating coil fixing rod 16R, the heating coil fixing bracket 16B.

As described above, the heating coil 16 is fixed via the heating coil fixing rod 16R, the heating coil fixing bracket 16B.

In addition to the heating coil 16, the cooling jacket 17 is not fixed to the moving device 50 also and is fixed to a not shown member. Therefore, even if the moving device 50 moves in the directions shown by the arrows D1 and D2, the cooling jacket 17 does not move and the position thereof does not change and is fixed.

Consequently, even if the moving device 50 moves in the directions shown by the arrow D1 and D2, the positions of the cooling jacket 17 and the heating coil 16 are always fixed and the relative positions between the cooling jacket 17 and the heating coil 16 are not changed.

Figure 3:
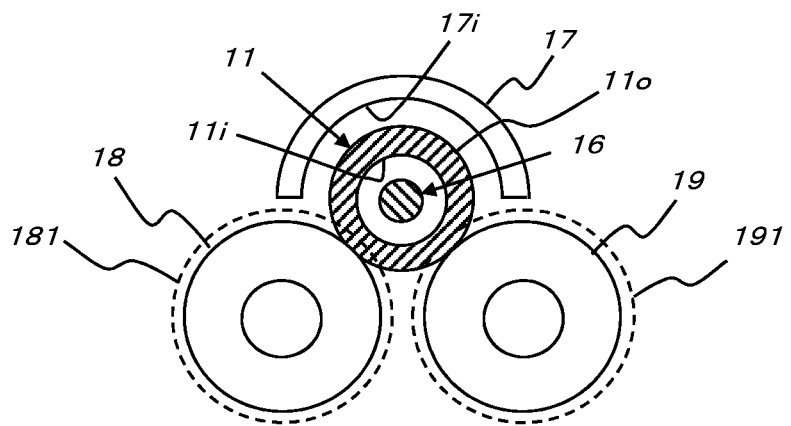
FIG. 3 It is a Y-arrow view of FIG. 2.

In additions, as shown in FIG. 3, the cooling jacket 17 is formed into, for example, a semicircular shape in a sectional plane.

As aforementioned, one pair of the rotation rollers 18, 19 are rotated by the roller rotating motor 20 and the bushing 11 is mounted thereon.

The relative positions (the relative positions viewed in the direction shown by the arrow Y in FIG. 2) of the bushing 11, the rollers 18, 19, the cooling jacket 17 and the heating coil 16 are shown in FIG. 3.

Although not clearly shown in FIG. 3, when cooling in the quenching of the second process, the cooling liquid (for example, cooling water) being not illustrated in FIG. 3 is injected from an inner circumferential surface 17i of the semicircular cooling jacket 17 to the outer circumferential surface 11o of the bushing 11. While the bushing inner circumferential surface 11i side is being heated by the heating coil 16, the cooling liquid is injected from the inner circumferential surface 17i of the cooling jacket 17.

When cooling the inner circumferential surface 11i side of the bushing 11 by the cooling device 100 in FIG. 2, relative positional relationships of the cooling liquid injection nozzle 34, the rollers 18, 19, the heating coil 16 and the bushing 11 are shown in the drawings of FIGS. 4 to 13, at respective stages of cooling in the quenching of the second process.

In order to simplify the illustrations, in the drawings of FIGS. 4 to 13, the cooling jacket 17 is not shown, and also, injecting of the cooling liquid from the cooling jacket 17 to the outer circumferential surface 11o of the bushing 11 is not shown.

Figure 4:
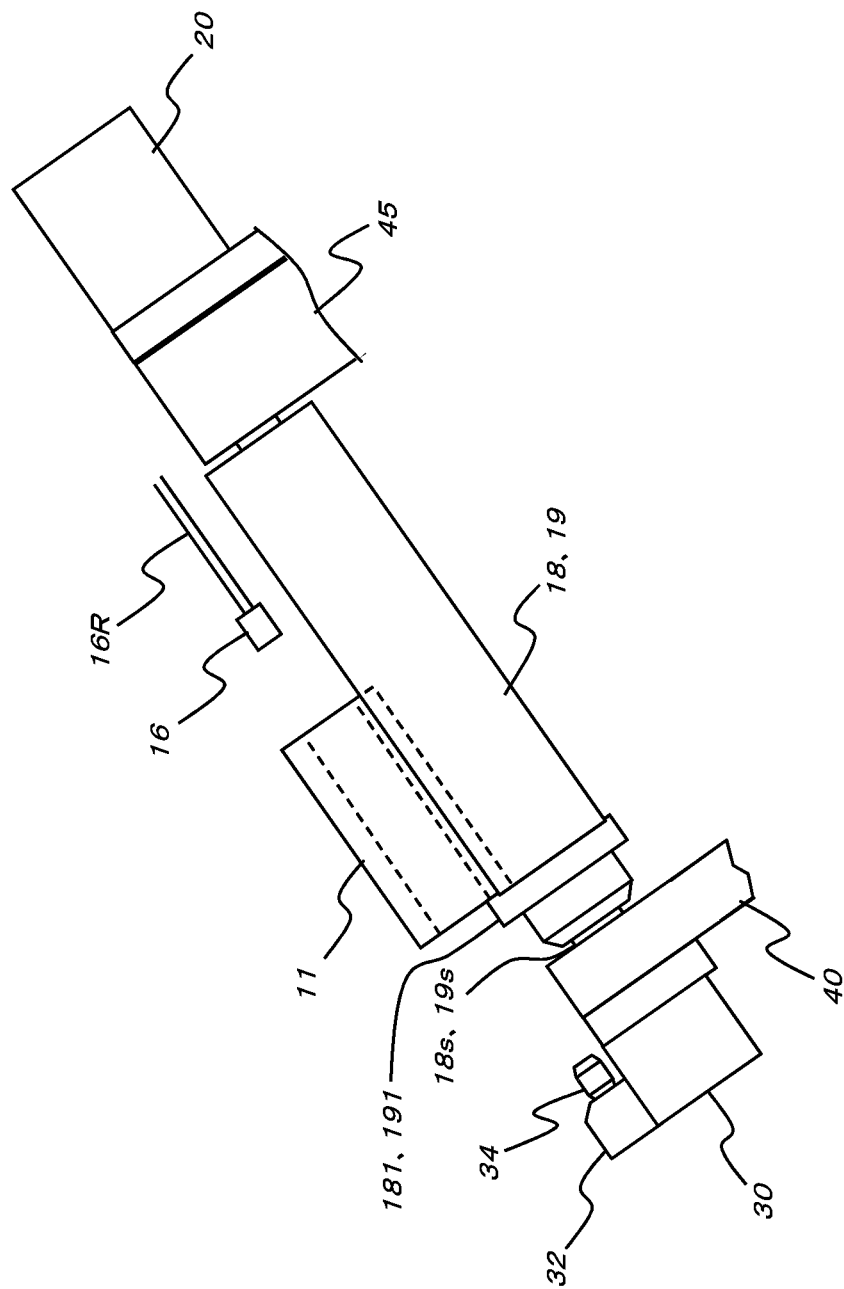
FIG. 4 It is an explanatory diagram simplistically showing the initial process of a heat treatment process by FIG. 2.

In FIG. 4, the bushing 11 is set on the rollers 18, 19 by an optional method.

At this time point, heating by the heating coil 16 is not started (the heating coil does "not yet" heat), and the cooling liquid is not injected from the cooling jacket 17. Then, also movements of the nozzle 34, the rollers 18, 19 and the bushing 11 in the direction of the arrow D1 (FIGS. 2 and 5) are not started, the cooling liquid is not injected from the nozzle 34, and the rollers 18, 19 are not rotated.

In a situation shown in FIG. 4, the moving device 50 (FIG. 2) is stopped at a position so that the bushing 11 does not interfere with the heating coil 16 and the cooling jacket 17 (FIG. 2) when the bushing 11 is set on the rollers 18, 19.

Figure 5:
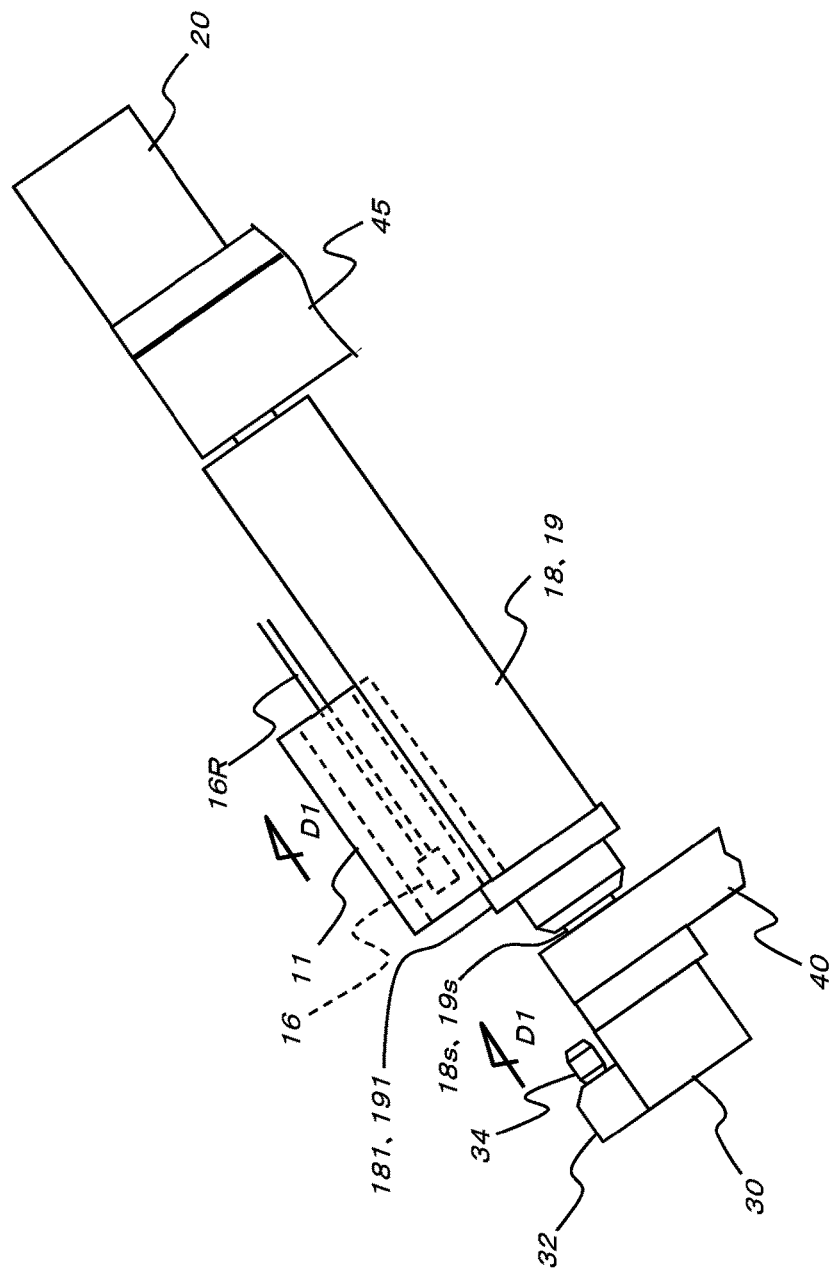
FIG. 5 It is an explanatory diagram simplistically showing the next process of FIG. 4.

Next, as shown in FIG. 5, movement of the moving device 50 (FIG. 2) is started, the nozzle 34, the rollers 18, 19 and the bushing 11 integrally move in the direction shown by the arrow D1. Consequently, the relative positions of the heating coil 16 being fixed and the bushing 11 are changed, the heating coil 16 is positioned in a space (a hollow region) being in the inner circumference side of the bushing 11. In other words, in the above-mentioned relative positions, the heating coil 16 is inserted into the space in the inner circumference side of the bushing 11.

In this situation, heating by the heating coil 16 being fixed is not yet started (the heating coil does "not yet" heat), the cooling liquid is not injected from the cooling jacket 17, and the cooling liquid is not injected from the nozzle 34.

Figure 6:
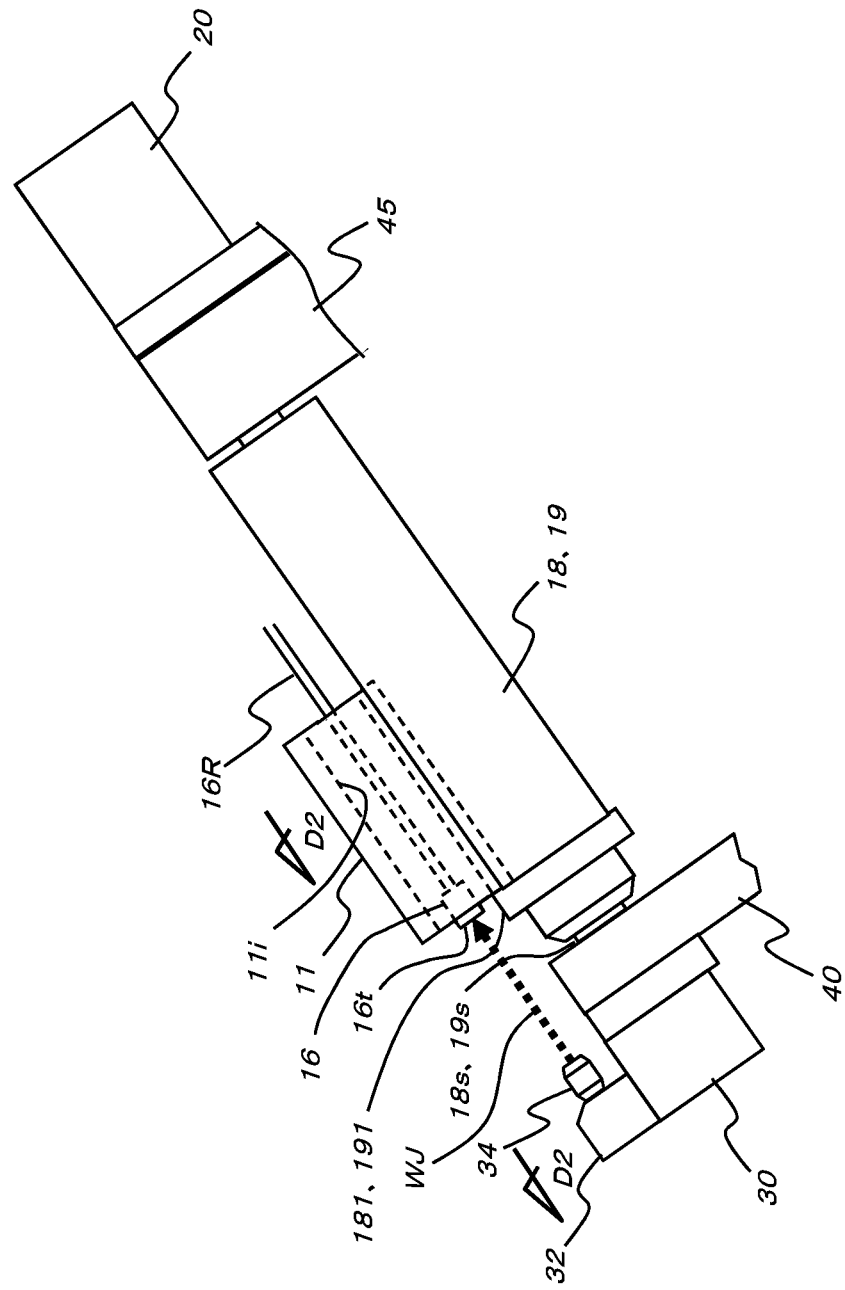
FIG. 6 It is an explanatory diagram simplistically showing the next process of FIG. 5.

In a situation shown in FIG. 6, induction heating is started by applying electrical current to the heating coil 16.

As described above, the bushing 11 is heated to the temperature which is at least the $Ac_3$ temperature on the inner circumferential surface 11i side in a left lower region of the bushing 11 in FIG. 6 by induction heating being carried out by the heating coil 16.

Further, in the situation in FIG. 6, before heating by the heating coil 16 is started or simultaneously with start of heating, the rollers 18, 19 start to rotate and injecting of the cooling liquid is started from the inner circumferential surface of the cooling jacket 17 (an illustration of the cooling liquid injection is omitted in FIG. 6). After heating by the heating coil 16 has been started, injecting of the cooling liquid is started from the nozzle 34. A cooling liquid injection (a cooling liquid jet stream) from the nozzle 34 is shown by a symbol WJ.

Simultaneous to the start of cooling liquid injecting from the nozzle 34, the movements of the nozzle, the rollers 18, 19 and the bushing 11 are started in the direction shown as the arrow D2.

An embodiment of injecting the cooling liquid from the nozzle 34 will be explained hereinafter with reference to FIG. 7.

Figure 7:
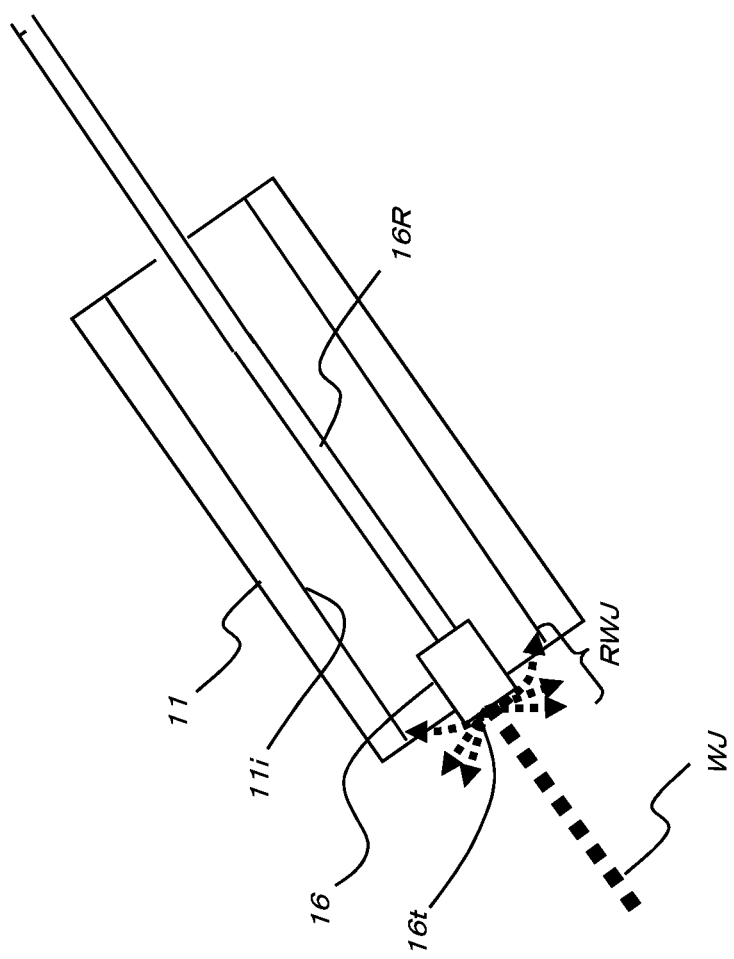
FIG. 7 It is an explanatory diagram simplistically showing start of injecting of the cooling liquid, start of movement of a bushing and start of rotation of a roller in the process shown in FIG. 6.

When the relative positional relation between the bushing 11 and the heating coil 16 enters a situation shown in FIG. 7, injecting of the cooling liquid from the nozzle 34 is started (the nozzle 34 is not shown in FIG. 7). That is, when the cooling liquid (the jet stream WJ) being injected from the nozzle 34 collides to the end face 16t at a side which faces to the nozzle 34 (the end face on the left lower side in FIG. 7) of the heating coil 16, and the scattered cooling liquid (the scattering liquid) RWJ enters a situation of reaching the bushing inner circumferential surface 11i, the cooling liquid is injected from the nozzle 34 (the nozzle 34 is not shown in FIG. 7). In other words, at a time point, at which the cooling liquid (the jet stream) WJ collides with the nozzle side end face 16t (the end face on the left lower side in FIG. 7) of the heating coil 16 and the cooling liquid (the scattering liquid) RWJ being scattered reaches to the inner circumferential surface 11i of the bushing 11, the injections WJ of the cooling liquid is started.

The above-mentioned time point can be determined by detecting the position of the bushing 11 in a case where the scattering liquid RWJ reaches to the inner circumferential surface 11i by means of sensors and a proximity switch.

Also, it is possible to count preliminarily a time after the bushing 11 has been set on the rollers 18, 19 (FIG. 4) until it reaches a position as shown in FIG. 7, to decide whether said preliminarily counted time is elapsed by means of a timer after the bushing 11 has been set on the rollers 18, 19, and to determine whether it is a time point, at which injecting of the cooling liquid from the nozzle 34 should be started. Other than the above, it is possible to automatically control the time point of starting injecting of the cooling liquid from the nozzle 34 by means of well-known technical contents.

Injecting of the cooling liquid from the cooling jacket 17 inner circumferential surface, the start of movement of the bushing 11 and the nozzle 34 in the direction shown by the arrow D2 (see FIG. 6), the start of rotation of the rollers 18, 19 are carried out before the start of heating by the heating coil 16 (before the start of injecting of the cooling liquid from the nozzle 34) or simultaneously with the start of heating by the heating coil 16.

Since in the situations shown in FIGS. 6 and 7, the rollers 18, 19 rotate and the bushing 11 rotates, the cooling liquid is uniformly injected to the outer circumferential surface of the bushing 11 regardless of the situation of injecting of the cooling liquid from the cooling jacket 17 inner circumferential surface.

Likewise, in a case that the bushing 11 is rotated when the cooling liquid is injected from the nozzle 34 and collides with the end face 16t of the heating coil 16, and the collided cooling liquid scatters to the inner circumferential surface 11i of the bushing 11, the cooling liquid will uniformly collide with the inner circumferential surface 11i of the bushing 11.

Figure 8:
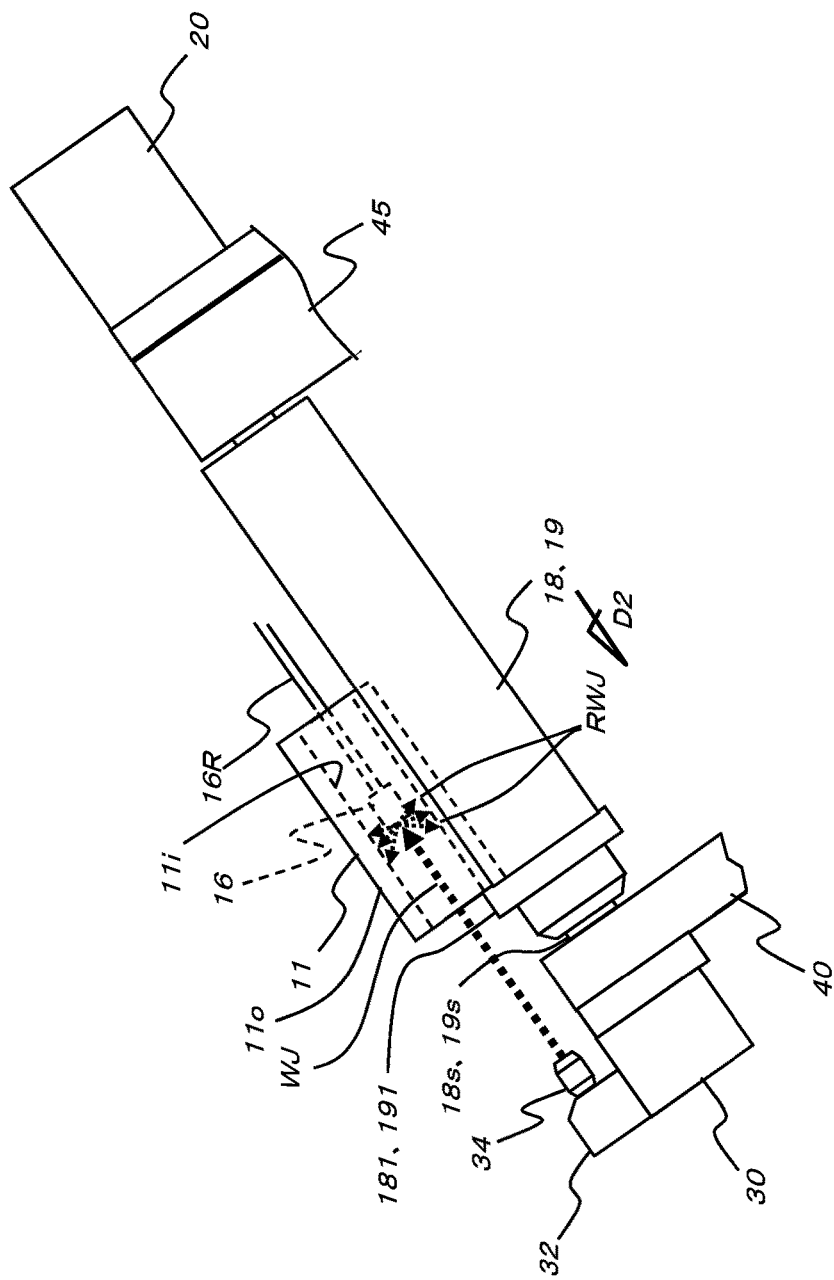
FIG. 8 It is an explanatory diagram simplistically showing the next process of FIG. 6.

A situation that the bushing 11 and the nozzle 34 have been moved in the arrow D2 direction from the situation shown in FIG. 6 is shown in FIG. 8.

In the situation shown in FIG. 8, the bushing inner circumferential surface 11i side is heated by the heating coil 16 and (the injection of) the cooling liquid WJ from the nozzle 34 collides with the nozzle side end face 16t of the heating coil 16 and (the cooling liquid WJ) scatters, the scattering liquid RWJ collides with the bushing inner circumferential surface 11i, and the bushing inner circumferential surface 11i side is cooled by the scattering liquid RWJ.

Also, the cooling liquid is being injected from the cooling jacket 17 to the bushing outer circumferential surface 11o, which cooling liquid is not shown in FIG. 8.

In the situation shown in FIG. 8, the nozzle 34, the rollers 18, 19, and the bushing 11 keep to move in the direction shown by the arrow D2.

Since the rollers 18, 19 and the bushing 11 keep to rotate in the situation in FIG. 8, the above-mentioned scattering liquid RWJ evenly collides with the inner circumferential surface 11i of the bushing 11 and the inner circumferential surface 11i side of the bushing is uniformly cooled in a manner being similar to the above-described manner with reference to FIGS. 6 and 7. Similarly, the cooling liquid which is injected from the cooling jacket 17 is uniformly injected to the bushing outer circumferential surface 11o, and the bushing outer circumferential surface 11o is uniformly cooled.

Figure 9:
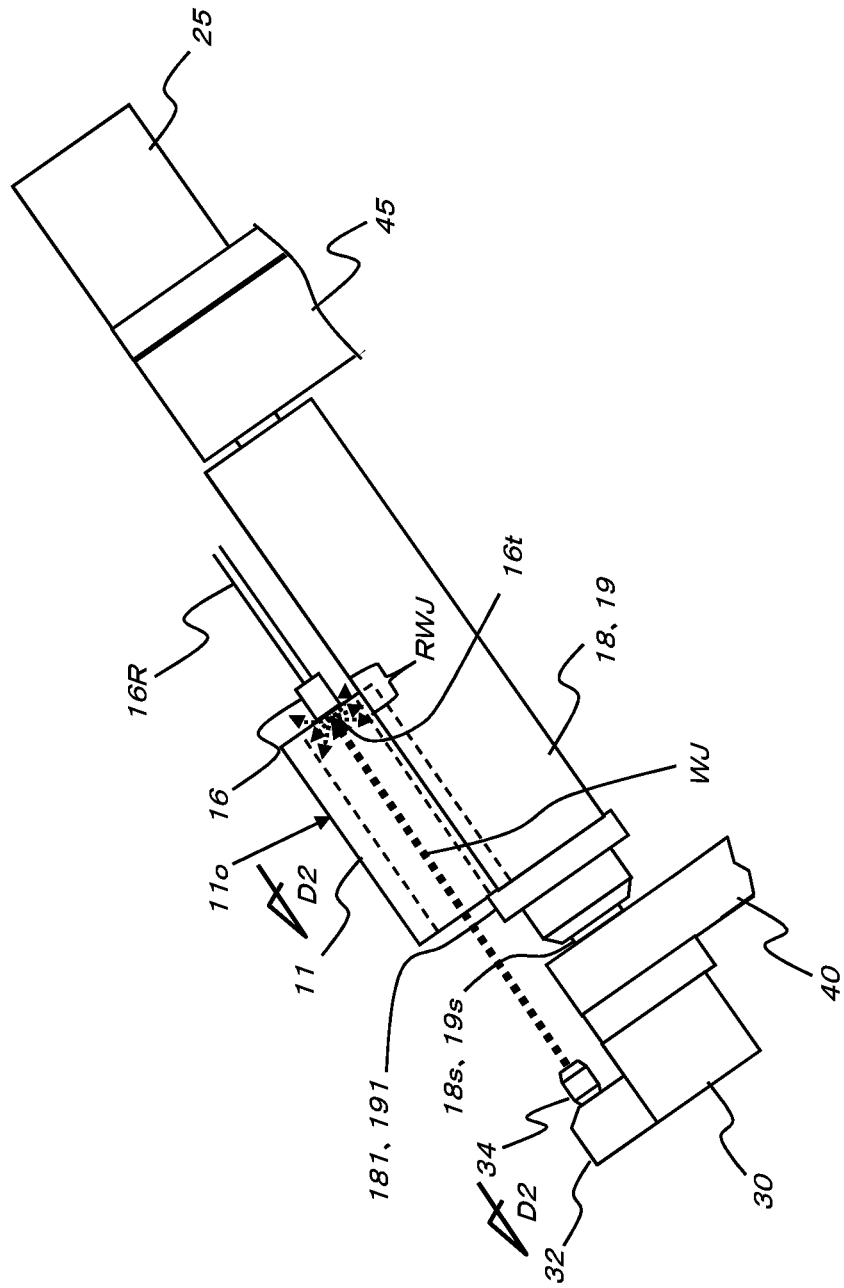
FIG. 9 It is an explanatory diagram simplistically showing the final process of induction heating of the bushing inner circumferential surface side.

When the bushing 11 and the nozzle 34 are moved from the situation shown in FIG. 8 in the direction shown by the arrow D2, a situation (or a manner) shown in FIG. 9 is carried out.

In the situation shown in FIG. 9, induction heating of the bushing inner circumferential surface 11i side by the heating coil 16 is at the final stage, and also, injecting of the cooling liquid from the cooling jacket 17 and cooling liquid injecting (the jet stream WJ) from the nozzle 34 are at the final stages.

When cooling liquid injecting is terminated, the rollers 18, 19, and the bushing 11 are stopped to rotate.

In FIG. 9, the nozzle 34, the rollers 18, 19 and the bushing 11 keep to move in the direction shown by the arrow D2.

The final stage of heating of the bushing inner circumferential surface 11i side by the heating coil 16 will be described hereinafter with reference to FIG. 10.

Figure 10:
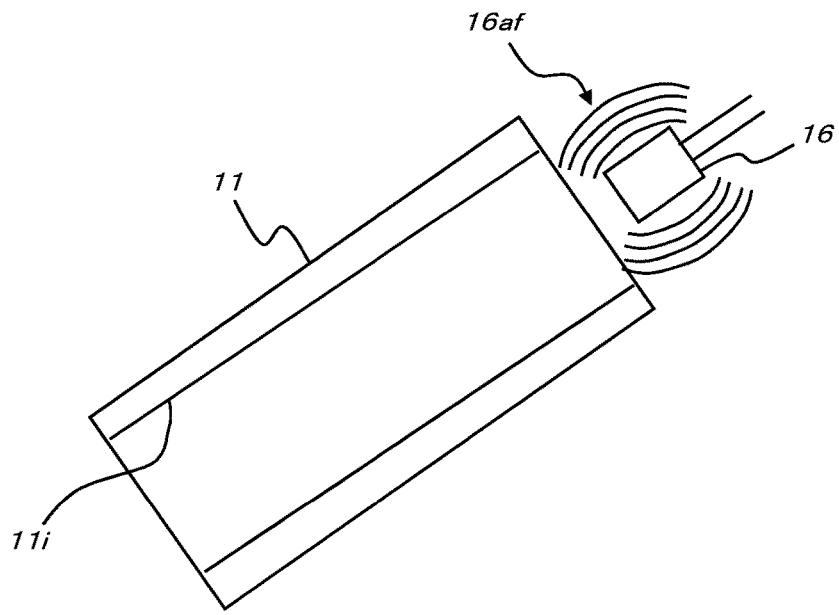
FIG. 10 It is an explanatory diagram simplistically showing a time point that heating by a heating coil is stopped.

In FIG. 10, the inner circumferential surface 11i side of the bushing 11 is out of a heating area (conveniently shown by a plurality of arcs 16af) which area is heated by the heating coil 16. Then, heating by the heating coil 16 is stopped at a time point at which the bushing inner circumferential surface 11i side has deviated from the heating area (heating range) 16af being heated by means of the heating coil 16, or at a time point at which the inner circumferential surface 11i side of the bushing 11 has been heated to the temperature being not more than the $AC_3$ point+200° C. (desirably, the $AC_3$ point+50° C.) to a right upper end of the bushing 11 (in FIG. 10).

This is because an electric supply to the heating coil 16 is a waste of energy in a case that the bushing inner circumferential surface 11i side is out of the heating area being heated by the heating coil 16 and the bushing inner circumferential surface 11i side may not be heated by the heating coil 16. Likewise, it is a waste of energy that the bushing 11 is heated by the heating coil 16 after the time point that the temperature of the bushing inner circumferential surface 11i side has been raised up to a predetermined temperature.

In addition, the stop of heating by the heating coil 16 that has been described with reference to FIG. 10 is carried out prior to the stop of cooling liquid injecting from the nozzle 34, which cooling liquid injection will be described later with reference to FIG. 11.

Also injecting of the cooling liquid from the inner circumferential surface of the cooling jacket 17 is terminated after the stop of heating by the heating coil 16.

Next, the final stage of cooling liquid injecting from the nozzle 34 will be described with reference to FIG. 11.

Figure 11:
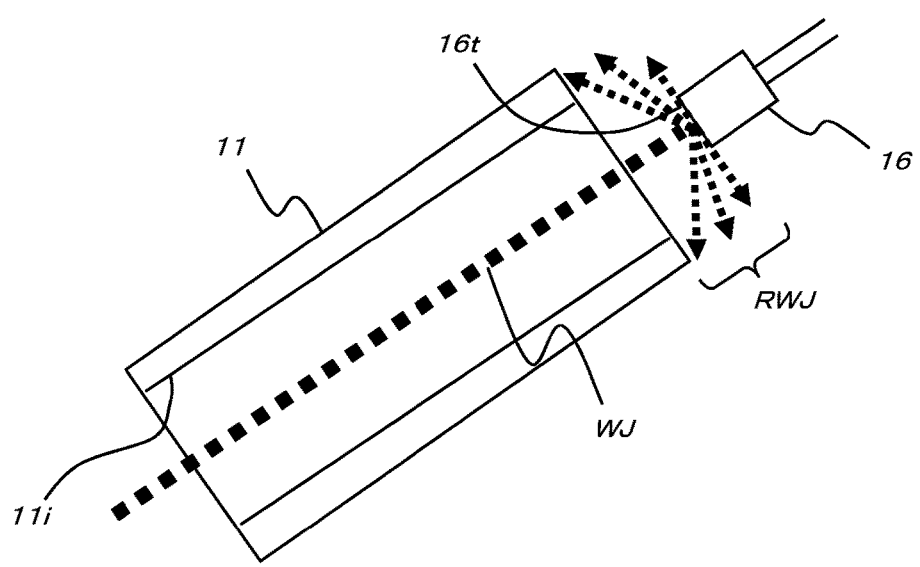
FIG. 11 It is an explanatory diagram simplistically showing a time point that cooling liquid injecting is stopped.

In FIG. 11, although the cooling liquid (the jet stream WJ) collides with the nozzle 34 side end face 16t (the end face on the left lower side in FIG. 11) of the heating coil 16, the scattering liquid RWJ does not reach (does not contact with) the bushing inner circumferential surface 11i. Then, at a time point at which the scattering liquid RWJ may not contact with the bushing inner circumferential surface 11i, injecting of the cooling liquid from the nozzle 34 is stopped. This is because injecting of the cooling liquid from the nozzle 34 is wasted in a case that the scattering liquid RWJ does not reach the bushing inner circumferential surface 11i, and therefore it becomes impossible to cool the bushing inner circumferential surface 11i side by the cooling liquid (and by the scattering liquid of the cooling liquid).

Although not clearly shown in FIG. 11, the rotation of the bushing 11 by the rollers 18, 19 is also terminated in conjunction with the stop of cooling liquid injection from the nozzle 34.

Figure 12:
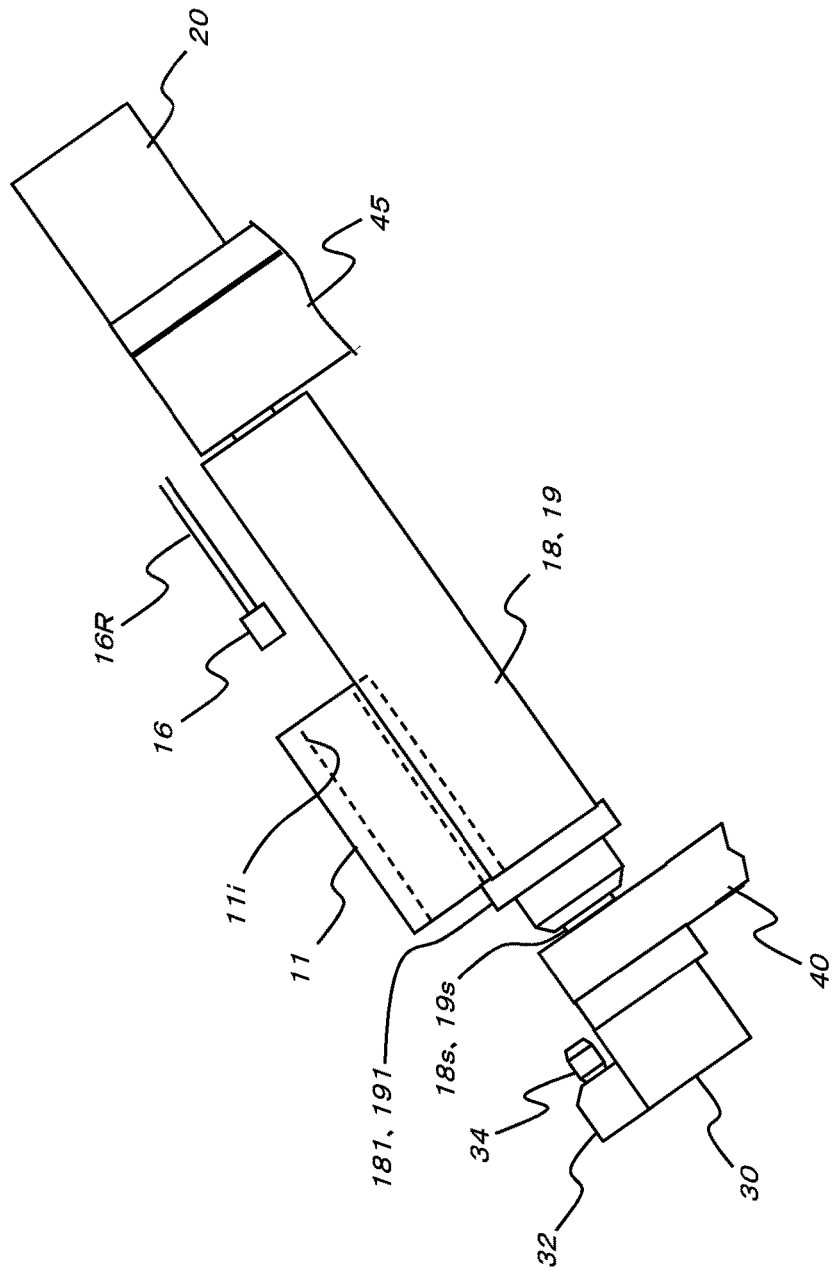
FIG. 12 It is an explanatory diagram simplistically showing the next process of FIG. 9.

When the nozzle 34, the rollers 18, 19, the bushing 11 move from the situation shown in FIG. 9 in the direction shown by the arrow D2, a situation shown in FIG. 12 is carried out. The situation shown in FIG. 12 is the same as the situation shown in FIG. 4.

That is, the cooling liquid is not injected from the nozzle 34, the nozzle 34, the rollers 18, 19, and the bushing 11 do not move in either of the arrow D1, D2 directions, also the rollers 18, 19, the bushing 11 do not rotate, the heating coil 16 stops to heat, and also, injecting of the cooling liquid from the cooling jacket 17 is stopped.

At a time point at which the situation shown in FIG. 12 has been carried out, quenching of the bushing inner circumferential surface 11i side is completed.

Figure 13:
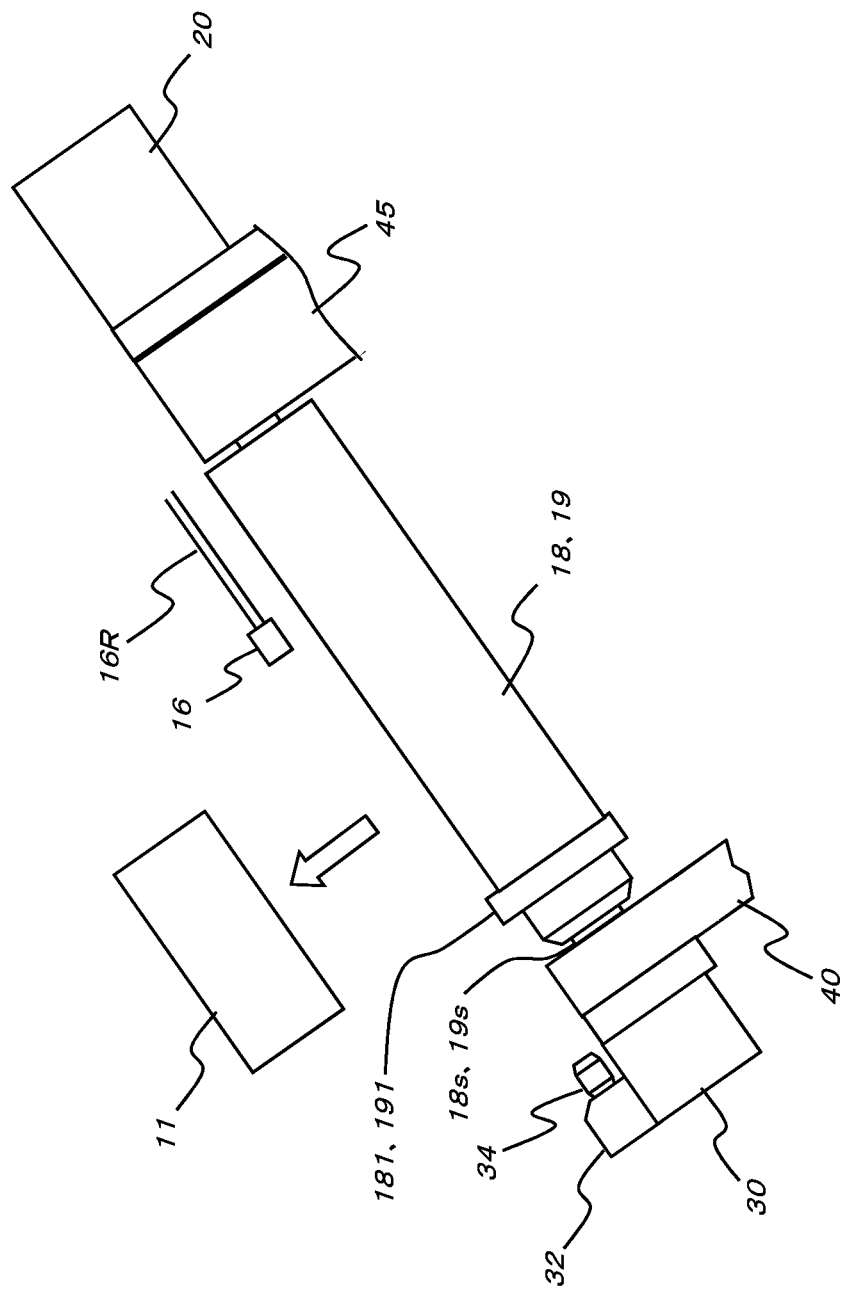
FIG. 13 It is an explanatory diagram simplistically showing the next process of FIG. 12.

In FIG. 13, the bushing 11 is taken out from a position on the rollers 18, 19, by optional operations not shown in FIG. 13.

Here, in the situation shown in FIG. 12, the heating coil 16 and the outer circumference cooling jacket 17 are completely out of (the inner hollow space of) the bushing 11. Therefore, when taking out the bushing 11 from the position on the rollers 18, 19, the bushing 11 does not interfere with the heating coil 16 and the outer circumference cooling jacket 17.

Then, a new bushing 11 to be heat-treated next is supplied and they return to the situation shown in FIG. 4.

A procedure of cooling the bushing inner circumferential surface 11*i* side shown in FIG. 4 to FIG. 13 will be described with reference to FIG. 14. Here, FIG. 14 simplistically shows the procedures of cooling the bushing inner circumferential surface 11*i* side which procedures were shown in FIGS. 4 to 13.

Figure 14:
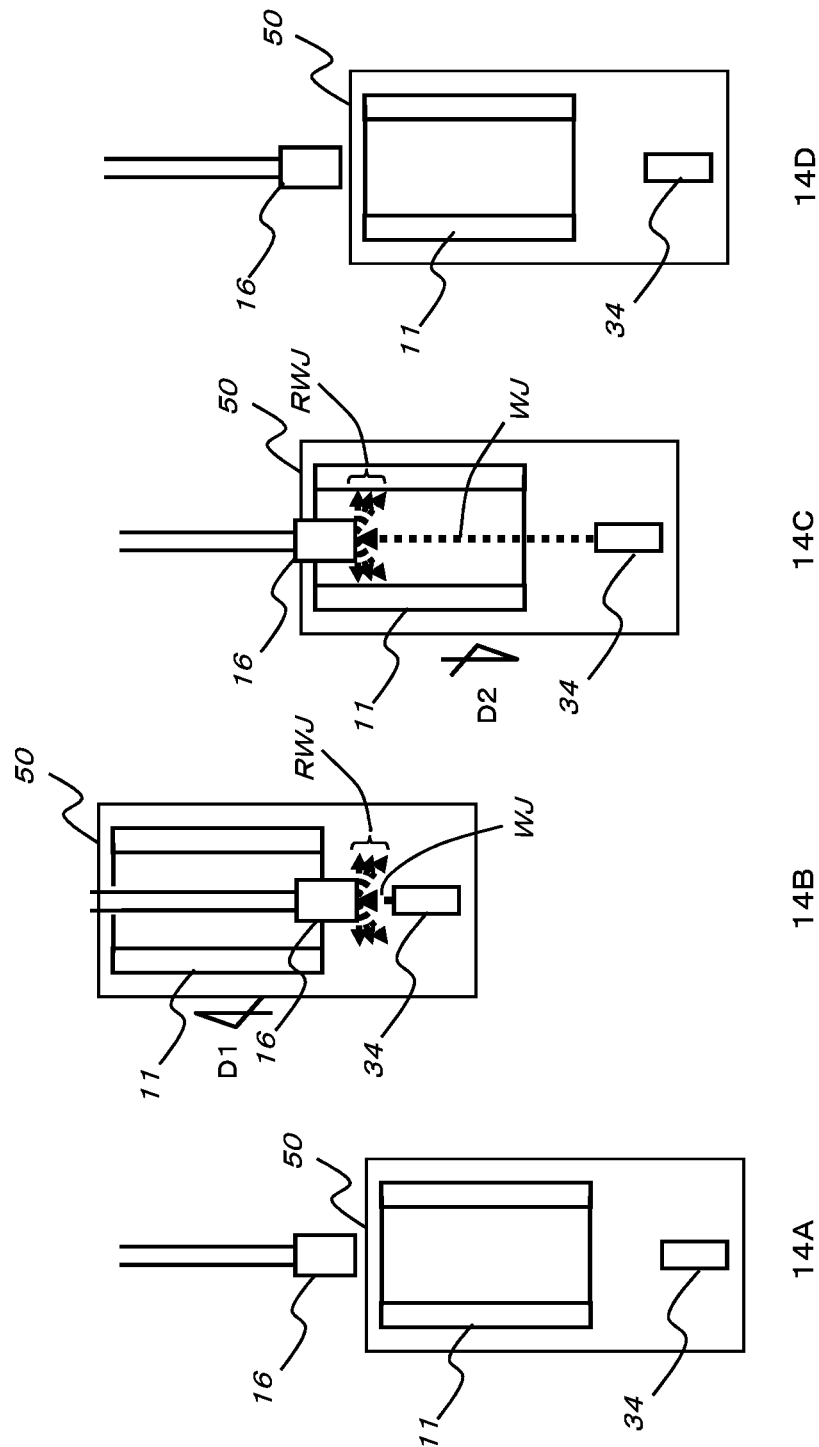
FIG. 14 It is an explanatory diagram simplistically showing a procedure of cooling the bushing inner circumferential surface side shown in FIG. 4 to FIG. 12.

In FIG. 14 (14A to 14D), the bushing 11 and the nozzle 34 are fixed to the moving device 50 and are moved following the moving device 50. On the other hand, the position of the heating coil 16 is fixed in FIG. 14 (14A to 14D).

Incidentally, also in FIG. 14, illustration of the cooling jacket 17 is omitted.

At the stage of "14A" in FIG. 14, the bushing 11 is set on the moving device 50 (the rollers 18, 19). At this stage, both of heating by the heating coil 16 and injecting of the cooling liquid from the nozzle 34 are not yet started.

At the stage of "14B" in FIG. 14, the moving device 50 moves in the arrow D1 direction and the moving device 50 stops at a position at which the heating coil 16 is inserted into the bushing 11 and the tip of the coil 16 is projected from a lower end of the bushing 11 by a predetermined length. Then, heating by the heating coil 16 and injecting of the cooling liquid (the jet stream WJ) from the nozzle 34 are started.

Simultaneously with the start of heating by the heating coil 16 and injecting of the cooling liquid (the jet stream. WJ) from the nozzle 34, the moving device 50 begins to move in the arrow D2 (see 14C) direction.

At the stage of "14C" in FIG. 14, the inner circumferential surface 11*i* side of the bushing 11 is heated by the heating coil 16 and the jet stream WJ of the cooling liquid from the nozzle 34 collides with the nozzle 34 side end face (the lower end face in 14C) of the heating coil 16, and the scattering liquid RWJ contacts with and cools the inner circumferential surface side of the bushing 11.

When moving the moving device 50 further in the arrow D2 (14C) direction from the situation shown in "14C", a situation shown in "14D" is carried out. The situation shown in "14D" is the same as the situation shown in "14A". Since in the situation shown in "14D", the heating coil 16 is at the position being detached from the bushing 11 (the position being out of the bushing 11), the heating coil 16 does not interfere with the bushing 11 which thereof have been carried out the heating procedure and cooling procedure to the inner circumferential surface side when the bushing 11 is taken out.

In the embodiment shown in the drawings, the cooling liquid is injected from the nozzle 34 toward the heating coil end face 16*t*, the injected cooling liquid WJ bounces off (as the scattering liquid RWJ) on the coil end face 16*t* and collides (contacts) with the inner circumferential surface 11*i* of the bushing 11. Consequently, it can surely cool the inner circumferential surface 11*i* side of the bushing 11.

Then, according to the embodiment shown in the drawings, in a case that the heating coil 16 is positioned in the radial inner region (area) of the bushing (the hollow inner space of the bushing 11), since the heating coil 16 induction heats the inner circumferential surface 11*i* side of the bushing 11 and the nozzle 34 injects the cooling liquid (the jet stream WJ) toward the heating coil end face 16*t*, the inner circumferential surface 11*i* side of the bushing 11 is heated to at least the $Ac_3$ point and is cooled with the cooling liquid (the scattering liquid RWJ) which has bounced off on the heating coil end face 16*t* while the heating coil 16 is positioned in the radial inner region of the bushing 11.

On the other hand, the cooling liquid is injected to the outer circumferential surface 11*o* of the bushing 11 from the cooking jacket 17 while the heating coil 16 is positioned in the radial inner region of the bushing 11.

Consequently, quenching (the quenching of the second process) is performed to the inner circumferential surface 11*i* side of the bushing 11 while the heating coil 16 is positioned in the radial inner region of the bushing 11, and simultaneously, cooling from the both of the outer circumferential surface 11*o* side and the inner circumferential surface 11*i* side of the bushing are carried out. Accordingly, it is possible to improve the wear resistance property by increasing the hardened layer depth on the outer circumferential surface 11*o* side while maintaining the hardened layer depth on the inner circumferential surface 11*i* side above the fixed one.

In other words, according to the embodiment shown in the drawings, a heat treatment can be efficiently performed by which heat treatment it is possible to make the outer circumferential surface 11*o* side and the inner circumferential surface 11*i* side of the bushing 11 have the hardness being more than of the effective hardness and to make the hardness of the core portion in the direction of the bushing thickness is less than the effective hardness.

In addition, according to the embodiment shown in the drawings, since the nozzle 34 is not positioned in the radial inner region of the bushing 11, when the heating coil 16 has been detached from the radial inner region of the bushing 11 and the inner circumference quenching of the bushing 11 are completed, any member of the heat treatment system is not positioned in the radial inner region of the bushing 11. Therefore, when inner circumference quenching of the bushing 11 is completed, the bushing 11 which has been completed an inner circumference quenching, can be immediately taken out and simultaneously a new bushing 11 to be heat-treated next is set.

That is, according to the embodiment shown in the drawings, in the quenching of the second process, the useless waiting time (for example, the time for waiting until the cooling jacket is detached from the radial inner region of the bushing) being necessary in the prior art becomes unnecessary. Consequently, according to the embodiment shown in the drawings, the work efficiency of the heat treatment of the bushing 11 is improved.

Further, according to the embodiment shown in the drawings, although the nozzle 34 injects the cooling liquid toward the end face 16*t* of the heating coil which is positioned in the radial inner region of the bushing 11, it does not mean that the nozzle 34 itself is inserted into the radial inner region of the bushing 11.

Therefore, by controlling the outer diameter of the jet stream, the injected cooling liquid intrudes into the radial inner region of the bushing 11, collides with the heating coil end face 16*t* and bounces off as the scattering liquid RWJ, and the scattering liquid RWJ collides with the inner circumferential surface 11i of the bushing 11 and surely cools it, regardless of the inner diameter size of the bushing 11.

Therefore, according to the embodiment shown in the drawings, the inner circumferential surface 11i side of the bushing 11 can be surely cooled with the cooling liquid and inner circumference quenching can be carried out, regardless of the inner diameter size of the bushing 11.

It is additionally noted that the embodiment shown in the drawings is merely illustrative and it is not a description which intends to limit the technical scope of the present invention.

For example, although in the embodiment shown in the drawings, through water (cooling water) is used as the cooling liquid, cooling oils and other cooling liquids can be used as "cooling liquid".

DESCRIPTION OF REFERENCE NUMERALS OR SYMBOLS

11 . . . bushing
12, 16 . . . heating coil
13, 17 . . . cooling jacket
18, 19 . . . workpiece rotating roller
20 . . . roller rotating motor
30 . . . cooling liquid supply block
34 . . . nozzle
50 . . . moving device
60 . . . rail

The invention claimed is:

1. A heat treatment system, characterized in that said system comprises:
a rotating device which rotates a cylindrical workpiece;
a holding member which holds the cylindrical workpiece at a predetermined position;
a heating member which heats the cylindrical workpiece from an inner circumferential surface side;
a cooling device which cools the cylindrical workpiece from an outer circumferential surface side by injecting a cooling liquid;
an injecting device which is mounted at a position remote from the cooling device and injects the cooling liquid;
a heating member holding member which hold the heating member fixedly in position;
a cooling device holding member which hold the cooling device fixedly in position; and
a base member to which the rotating device and the injecting device are attached and which moves relative to the heating member and the cooling device, wherein
the heating member is capable of heating the inner circumferential surface side of the cylindrical workpiece when the base member moves while the heating member is positioned in a radial inner region of the cylindrical workpiece which has been held by the holding member, and wherein
the injecting device is capable of injecting the cooling liquid toward a heating member end face when the base member moves while the heating member is positioned in the radial inner region of the cylindrical workpiece which has been held by the holding member.

2. The heat treatment system according to claim 1, wherein
said base member is inclined relative to a horizontal plane,
said holding member is capable of holding the cylindrical workpiece by a injecting device side end part of the rotating device,
said base member is capable of moving toward a side which is close to the heating member when the cylindrical workpiece is held by the injecting device side end part of the rotating device, and capable of moving toward a side which is separated from the heating member when the heating member is positioned in the vicinity of the injecting device side end part of the radial inner region of the cylindrical workpiece,
said heating member is capable of starting induction heating when the heating member is positioned in the vicinity of the injecting device side end part of the radial inner region of the cylindrical workpiece,
said injecting device is capable of starting cooling liquid injecting toward the heating member end face when said heating member is positioned in the vicinity of the injecting device side end part of the radial inner region of the cylindrical workpiece, and
said cooling device is capable of starting cooling liquid injecting to the workpiece outer circumferential surface when said heating member is positioned in the vicinity of the injecting device side end part of the radial inner region of the cylindrical workpiece.

3. A heat treatment method, characterized in that said method comprises:
a step for holding a cylindrical workpiece at a predetermined position by a holding member;
a step for positioning a heating member in a radial inner region of the cylindrical workpiece held by the holding member, by a base member to which a rotating device and a injecting device are attached and which moves relative to the heating member and a cooling device; and
a step for heating the cylindrical workpiece by the heating member from an inner circumferential surface side while cooling the cylindrical workpiece from the outer circumferential surface side by injecting a cooling liquid from the cooling device and injecting the cooling liquid from the injecting device toward a heating member end face.

4. The heat treatment method according to claim 3,
wherein the step for cooling the cylindrical workpiece from the outer circumferential surface side by injecting the cooling liquid from the cooling device is started when the cooling device is positioned in an area closest to the injecting device,
wherein the step for heating the cylindrical workpiece from the inner circumferential surface side by the heating member is started when the heating member is positioned in an area closest to the injecting device, and
wherein the step for injecting the cooling liquid from the injecting device toward the heating member end face is started when the heating member is positioned in the area closest to the injecting device.

5. The heat treatment method according to claim 4, wherein
a first quenching process and a second quenching process are carried out,
in the first quenching process, quench hardening is performed across the entire thickness of said workpiece by heating merely from the outer circumferential surface side of the cylindrical workpiece to a temperature between a temperature equal to the $Ac_3$ temperature and a temperature less than or equal to the $Ac_3$ temperature+200° C. of the workpiece across the entire thickness of said workpiece, starting cooling before the temperature of said workpiece is lowered down to the $Ar_3$ point and cooling said workpiece from the outer circumferential surface side, in the second quenching process, said workpiece which has been subjected to the quench hardening is cooled from the outer circumferential surface side of said workpiece by injecting the cooling liquid from the cooling device, said workpiece is heated from the inner circumferential surface side by the heating member and is heated to said temperature, and the cooling liquid is injected from the injecting device toward the heating member end face.

6. The heat treatment method according to claim 3, wherein a first quenching process and a second quenching process are carried out, in the first quenching process, quench hardening is performed across the entire thickness of said workpiece by heating merely from the outer circumferential surface side of the cylindrical workpiece to a temperature between a temperature equal to the $Ac_3$ temperature and a temperature less than or equal to the $Ac_3$ temperature+200° C. of the workpiece across the entire thickness of said workpiece, starting cooling before the temperature of said workpiece is lowered down to the $Ar_3$ point and cooling said workpiece from the outer circumferential surface side, in the second quenching process, said workpiece which has been subjected to the quench hardening is cooled from the outer circumferential surface side of said workpiece by injecting the cooling liquid from the cooling device, said workpiece is heated from the inner circumferential surface side by the heating member and is heated to said temperature, and the cooling liquid is injected from the injecting device toward the heating member end face.

\* \* \* \* \*